United States Patent
Shin et al.

(10) Patent No.: US 8,577,589 B2
(45) Date of Patent: Nov. 5, 2013

(54) METHOD AND APPARATUS FOR PROVIDING LOCATION INFORMATION-BASED SCHEDULING SERVICE OF PORTABLE TERMINAL

(75) Inventors: Dong Jun Shin, Seoul (KR); Kyoung Taek Kim, Seongnam-si (KR); Hyun Kyoung Kim, Seoul (KR); Hyang Ah Kim, Seongnam-si (KR); Jin Yong Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 588 days.

(21) Appl. No.: 12/480,122

(22) Filed: Jun. 8, 2009

(65) Prior Publication Data
US 2010/0004854 A1 Jan. 7, 2010

(30) Foreign Application Priority Data
Jul. 3, 2008 (KR) ........................ 10-2008-0064253

(51) Int. Cl.
*G01C 21/00* (2006.01)
*G06F 15/16* (2006.01)

(52) U.S. Cl.
USPC ........ 701/300; 701/422; 705/7.13; 455/456.3

(58) Field of Classification Search
USPC .......... 701/300, 204, 213, 422, 423; 705/4, 8, 705/9, 7.12, 7.13; 455/456.3, 456.1; 379/380
See application file for complete search history.

(56) References Cited

U.S. PATENT DOCUMENTS

| | | | |
|---|---|---|---|
| 6,424,910 B1 | 7/2002 | Ohler et al. | |
| 6,885,874 B2 * | 4/2005 | Grube et al. | 455/520 |
| 7,064,681 B2 * | 6/2006 | Horstemeyer | 340/994 |
| 7,606,661 B2 * | 10/2009 | Kwak | 701/420 |
| 2003/0046304 A1 * | 3/2003 | Peskin et al. | 707/104.1 |
| 2004/0254721 A1 * | 12/2004 | Saiki | 701/207 |
| 2005/0283308 A1 * | 12/2005 | Szabo et al. | 701/207 |
| 2006/0155465 A1 * | 7/2006 | Jung et al. | 701/209 |
| 2007/0118415 A1 * | 5/2007 | Chen et al. | 705/8 |
| 2008/0086455 A1 | 4/2008 | Meisels et al. | |
| 2010/0235082 A1 * | 9/2010 | Taniyama et al. | 701/201 |
| 2011/0077860 A1 * | 3/2011 | Coughlin et al. | 701/204 |

FOREIGN PATENT DOCUMENTS

| | | |
|---|---|---|
| EP | 1 434 032 | 6/2004 |
| KR | 10-2005-0093210 | 9/2005 |
| KR | 10-2006-0009206 | 1/2006 |

OTHER PUBLICATIONS

European Search Report for corresponding EP Application No. 09162167.2-1236 dated Jun. 18, 2012.

* cited by examiner

*Primary Examiner* — Tan Q Nguyen
(74) *Attorney, Agent, or Firm* — H.C. Park & Associates, PLC

(57) ABSTRACT

A method and apparatus for providing a location information-based scheduling service is disclosed. The method includes determining a meeting point or appointed place based on location information associated with a plurality of portable terminals. The method includes suggesting various routes and means to travel to the appointed place; and providing data content to a user of a first portable terminal until one or more users associated with the other portable terminals arrive at the appointed place. The appointed place can be determined based on a distance between all the portable terminals and/or their respective movement times. Users can share their expected arrival times and information regarding their current locations while traveling towards the appointed place. If a portable terminal user requests a content while waiting for other users to arrive, the surplus time can be calculated and available contents can be provided within the surplus time.

19 Claims, 8 Drawing Sheets

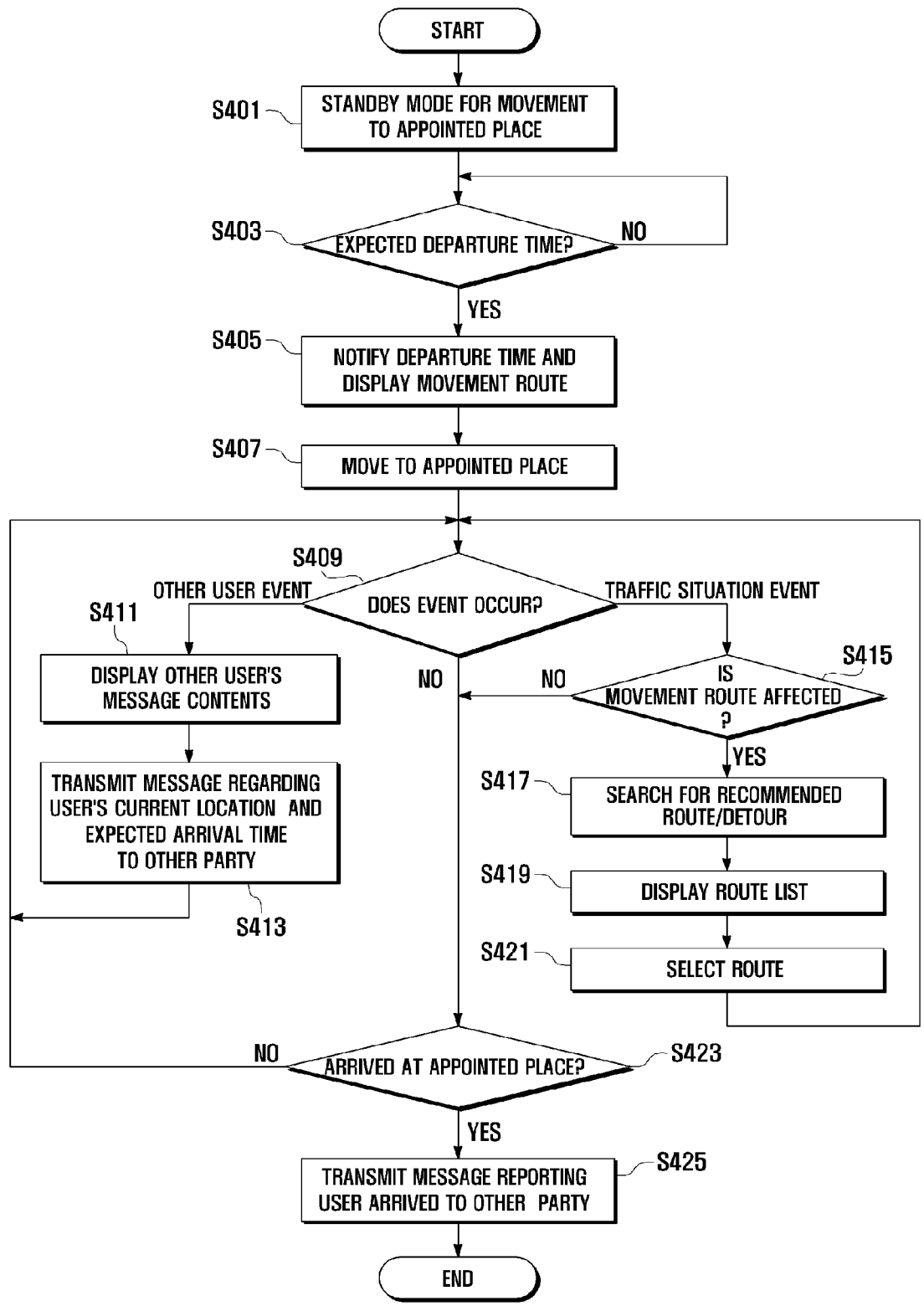

FIG. 5

(a)
Indicator
ROUTE LIST
FROM CURRENT LOCATION TO STATION 1
☐ SUBWAY (10 STATIONS)
☑ SELF-DRIVE (20 KM)
☐ WALK (2 HRS REQUIRED)
SELECT | CANCEL (b)
Indicator
MR. B ARRIVED AT STATION 1 AT 18:30
CONFIRMATION (c)
Indicator
MR. A IS NOW STATION 4 AND WILL TAKE 10 MINS TO REACH STATION 1
CONFIRMATION (d)
Indicator
DUE TO TRAFFIC ACCIDENT, DETOUR ROUTE IS SUGGESTED
☐ 10 KM (25 MINS REQUIRED)
☑ 13 KM (17 MINS REQUIRED)
SELECT | CANCEL (e)
Indicator
MR. A NOW ARRIVED AT STATION 1
CONFIRMATION FIG. 7
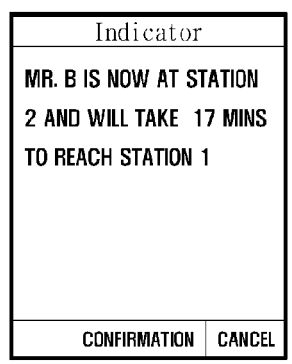
(a)
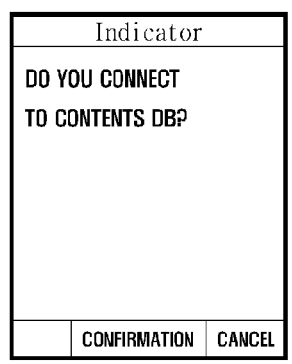
(b)
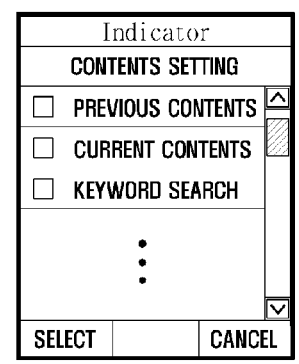
(c)
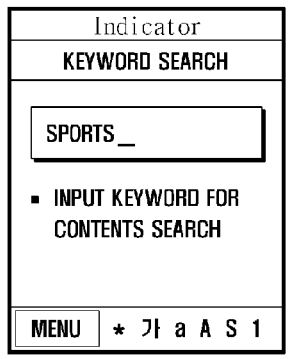
(d)
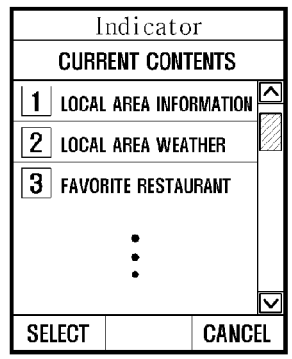
(e)
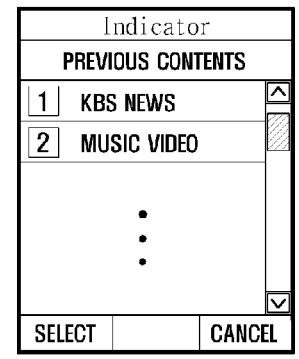
(f)

METHOD AND APPARATUS FOR PROVIDING LOCATION INFORMATION-BASED SCHEDULING SERVICE OF PORTABLE TERMINAL

CROSS REFERENCE TO RELATED APPLICATION

This application claims priority from and the benefit of Korean Patent Application No. 10-2008-0064253, filed on Jul. 3, 2008, which is hereby incorporated by reference for all purposes as if fully set forth herein.

BACKGROUND OF THE INVENTION

1. Field of the Invention

Embodiments of the present invention relate to portable terminals. More particularly, exemplarly embodiments of the present invention relate to a method and apparatus for providing a location information-based scheduling service of a portable terminal that can determine location information regarding a plurality of portable terminals, and can determine and an appointed place.

2. Description of the Background

A location-based service (LBS) refers to a variety of information services related to a location of a portable terminal obtained using a mobile communication network and satellite signals. The LBS can be realized using mobile communication network technology, location tracking technology, mobile communication technology, and/or integrated information technology. The LBS can have applications in various areas including in emergency rescue operations, vehicle navigation, electronic trade, environment, medicine, and administrating location-based contents and traffic information.

In order to select an appointed place for several users, a conventional portable terminal needs a user to verbally obtain information regarding the user's location and others' locations. A user may subsequently select a corresponding location and request the user's selection from other users.

The conventional portable terminal cannot provide an expected arrival time of a user or another user from a current place to an appointed place and cannot provide location information regarding a current location. The conventional portable terminal also cannot suggest a route to the appointed place that a user intends to move along.

SUMMARY OF THE INVENTION

Exemplary embodiments of the present invention provide a method and apparatus for determining an appointed place, based on the locations of all users.

Exemplary embodiments of the present invention further provide a method that can suggest a movement route to an appointed place to a user and allow users to share their movement routes, thereby providing improved convenience to the users.

Exemplary embodiments of the present invention further provide contents that a user can view after arriving at an appointed place.

Additional features of the exemplary embodiments will be set forth in the description which follows, and in part will be apparent from the description, or may be learned by practice of the invention.

An exemplary embodiment of the present invention discloses a method for providing a location information-based scheduling service. The method comprises receiving, by a first portable terminal, pieces of location information from at least one other portable terminal and comparing the pieces of location information with location information associated with an appointed place. The method further comprises calculating a surplus time of the first portable terminal; and providing, to the first portable terminal, available contents within the surplus time.

Another exemplary embodiment of the present invention discloses an apparatus for providing a location information-based scheduling service. The apparatus comprises a location tracking unit to receive pieces of location information from at least one portable terminal, and a controller to compare the pieces of location information with location information associated with an appointed place. The controller is configured to calculate surplus time and provide available contents within the surplus time.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 4 is a flow chart describing a process where a user moves to an appointed place according to a registered schedule, according to an exemplary embodiment of the present invention.

FIG. 5A, FIG. 5B, FIG. 5C, FIG. 5D, and FIG. 5E show screens displaying a process where a user moves to an appointed place according to a registered schedule, according to an exemplary embodiment of the present invention.

FIG. 7A, FIG. 7B, FIG. 7C, FIG. 7D, FIG. 7E and FIG. 7F show screens displaying a process for providing contents, according to an exemplary embodiment of the present invention.

DETAILED DESCRIPTION OF ILLUSTRATED EMBODIMENTS

Figure 1:
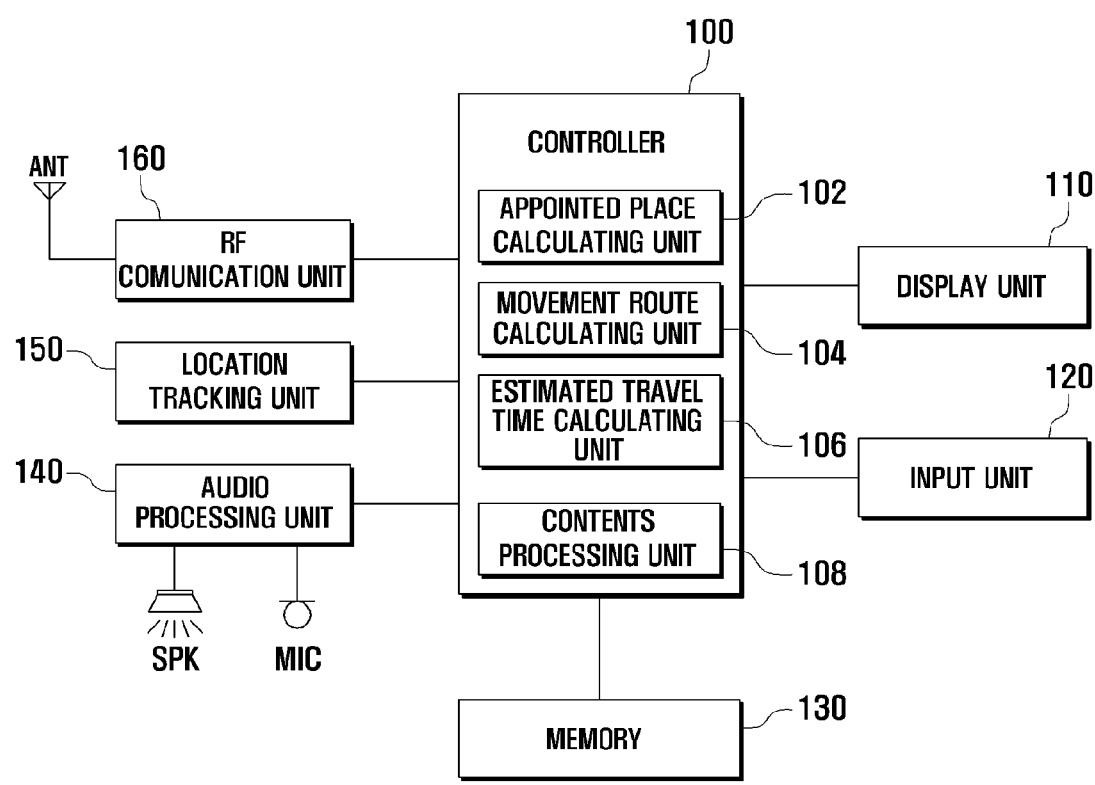
FIG. 1 is a schematic block diagram illustrating a portable terminal according to an exemplary embodiment of the present invention.

Embodiments of the present invention are described more fully hereinafter with reference to the accompanying drawings in which exemplary embodiments of the invention are illustrated. Embodiments of the invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the sizes and relative sizes of layers and regions may be exaggerated for clarity. Detailed descriptions of well-known functions and structures incorporated herein may be omitted to avoid obscuring the subject matter of the embodiments. Like reference numerals in the drawings denote like elements.

It will be understood that although the terms first, second, third etc. may be used herein to describe various elements, components, regions, layers and/or sections, these elements, components, regions, layers and/or sections should not be limited by these terms. These terms are used to distinguish one element, component, region, layer or section from another element, component, region, layer or section. A first element, component, region, layer or section discussed below could be termed a second element, component, region, layer or section without departing from the teachings of the present invention.

The terminology used herein is for the purpose of describing particular example embodiments and is not intended to be limiting of the present invention. As used herein, the singular forms "a," "an" and "the" can include the plural forms as well, unless the context clearly indicates otherwise. It will be further understood that the terms "comprises" and/or "comprising," when used in this specification, can specify the presence of stated features, integers, steps, operations, elements, and/or components, but do not necessarily preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Prior to describing exemplary embodiments of the present invention, relevant terms will be defined for the present description below.

'Contents' may refer to information that can be stored, selected, and confirmed by a portable terminal user and may also be transmitted to and received from other portable terminals. Examples of the contents include but are not limited to a phone number, a message, an MP3 file, an image file, a text file, and/or a moving image file.

An 'appointed place' may refer to a place that is calculated based on location information among a plurality of portable terminal users, a movement distance, a movement time, and/or traffic means.

An 'expected departure time' may refer to a time that a user may start to move from a current location to an appointed place and is set in light of a distance, a movement time, and/or traffic means from the current location to the appointed place. If a movement time will take 2 hours from a current location to an appointed place, the expected departure time may be set to a time 2 hours 10 minutes before the appointment time. If the current time becomes the set time, the portable terminal may notify a user that the current time has become the expected departure time.

A 'schedule' may refer to a type of program including, for example, an appointed place, an appointment time, and/or traffic means.

An 'event' may refer to an occurrence that may occur while a user moves to an appointed place. An 'event' may include a traffic accident and/or traffic jam and may be communicated through a message reception.

A 'surplus time' may refer to the time required for a user to move from a current location to an appointed place. The surplus time may be calculated from location information regarding the user's current location and the appointed place, at a time when the user requests content during movement towards the appointed place. The surplus time may also refer to a time difference from when a user arrives at an appointed place to when another user arrives at the appointed place. The surplus time may be calculated from location information regarding the other user's current location and the appointed place, at a time when the user has arrived at the appointed place and then requests content.

Although the portable terminal according to exemplary embodiments of the present invention is described based on a terminal that can use a location-based service, it will be appreciated that the portable terminal can be applied to various information communication devices, multimedia devices, and their applications, such as, a mobile phone, a personal digital assistant (PDA), a code division multiple access (CDMA) terminal, a wideband code division multiple access (WCDMA) terminal, a global system for mobile communication (GSM) terminal, an international mobile telecommunication 2000 (IMT-2000) terminal, a smart phone, a universal mobile telecommunication service (UMTS) terminal, a laptop computer, and/or a personal computer.

Hereinafter, exemplary embodiments of the present invention will be explained in detail with reference to the accompanying drawings.

FIG. 1 is a schematic block diagram illustrating a portable terminal according to an exemplary embodiment of the present invention.

Referring to FIG. 1, the portable terminal may include a controller 100, a display unit 110, an input unit 120, a memory 130, an audio processing unit 140, a location tracking unit 150, and an RF communication unit 160. The controller 100 may include an appointed place calculating unit 102, a movement route calculating unit 104, an estimated travel time calculating unit 106, and a contents processing unit 108.

The display unit 110 may display menus of a portable terminal, information from a user, and information provided to the user. For example, during the process of determining a schedule, the display unit 110 may display: a screen for searching another user's portable terminal; a message screen for determining an appointed place among portable terminal users; and checking traffic means to move towards the appointed place. The display unit 110 may display a screen for showing an appointed place list calculated by the use of location information of the portable terminal. In addition, during registration of a schedule and during movement towards an appointed place, the display unit 110 may display a screen for showing a list of movement routes to move towards the appointed place and a screen showing states regarding events that occur while the portable terminal user is moving. The event may be states where another user has arrived first at the appointed place, traffic accidents, and/or traffic jams. While a plurality of users are moving towards or arriving at an appointed place, the display unit 110 can display a screen having a map that shows location information of one or more users and/or who will arrive first or last at the appointed place. For example, if portable terminal users are moving by subway, the display unit 110 can display a subway route map highlighting subway stations at which the others portable terminal users are located. The display unit 110 can also display a screen for showing contents to a portable terminal user who has already arrived at an appointed place. The display unit 110 can be implemented with display devices, such as an LCD or OLED. In general, any suitable display device may be used. In some exemplary embodiments, if the LCD is implemented with a touch screen, the display unit 110 may also serve as an input means, such as the input unit 120.

The input unit 120 may be implemented with a key pad. The input unit 120 can also be implemented with a touch screen, a touch pad, and/or a scroll wheel. The input unit 120 can receive a command from a user and can output a control signal to the controller 100 in order to control operations of the portable terminal. In particular, the input unit 120 can detect input signals corresponding to a selection of an appointed place and a movement route, and may subsequently output the selection to the controller 100. The input unit 120 can also detect: an input signal generated as a content of a content database selected by a user's input key word; an input signal generated as a content corresponding to a selected user history; and an input signal generated as a content corresponding to an appointed place selected and then output to the controller 100.

The memory 130 may store application programs for operations of a portable terminal according to exemplary embodiments of the present invention. The memory 130 also stores location information of a portable terminal, an appointed place list, a movement time, a movement distance, a movement route, an expected departure time, a contents database, and/or a recommended route/detour according to an event that occurs during movement to an appointed place. The memory 130 can also register the appointed place list, the movement time, the movement distance, the movement route, and/or the expected departure time in a schedule. Furthermore, the memory 130 can store location information of a portable terminal based on dates and times.

The audio processing unit 140 may operate under the control of the controller 100. For example, the audio processing unit 140 may covert a digital audio signal to an analog audio signal and may output the audio signal via a speaker SPK under the control of the controller 100. If an expected departure time to start moving towards an appointed place is reached, the audio processing unit 140 may output, upon receiving a command from controller 100, an audio sound through the speaker SPK to notify a user that the expected departure time has been reached. When a content is played back, the audio processing unit 140 may receive an audio signal from the controller 100 and then output the audio signal through the speaker SPK.

The location tracking unit 150 may receive global positioning system (GPS) signals from at least one GPS satellite, and may detect information of a current location of a portable terminal, such as latitude, longitude, and may output the current location information to the controller 100. Current location information may contain an error if the location tracking unit 150 uses only signals received from GPS satellites. Accordingly, the location tracking unit 150 may further employ pilot phase file information and/or round trip delay information transmitted from a mobile communication base station in addition to the GPS signals in order to detect more precise location information of a portable terminal.

A mobile communication base station can serve two functions. One function may be to relay data between a mobile communication center and a portable terminal. The other function is to perform transmission of data that may be used to detect a location of a portable terminal (i.e., a location of a portable terminal user). In general, a base station in a CDMA network can detect a location of a portable terminal user though a cell tracking method. The cell tracking method can detect a location of a relay currently connected to a corresponding user's portable terminal and may thus acquire a location of the portable terminal user. Therefore, the location tracking unit 150 may receive location information described above and then detect a location of a corresponding portable terminal. The location tracking unit 150 may also receive location information from three or more base stations and then precisely detect current location information of a portable terminal by triangulation.

The RF communication unit 160 may establish a communication channel with a base station and may transmit/receive signals thereto/therefrom to detect location information of portable terminals. The RF communication unit 160 may include an RF transmitter for up-converting the frequency of transmitted signals and amplifying the transmitted signals, and an RF receiver for low-noise amplifying of received RF signals and down-converting the frequency of the received RF signals. During the process of determining an appointed place, the RF communication unit 160 may transmit/receive a message to/from the base station to determine whether to check traffic means en route to the appointed place or to agree to a schedule. The RF communication can also transmit/receive to/from the base station a message generated during movement towards an appointed place. For example, the RF communication unit 160 can allow a user to transmit/receive a message notifying other users who may have already arrived at the appointed place of the user's current movement state.

The controller 100 may control the entire operation of the portable terminal and signal flow between units within the portable terminal. In particular, the controller 100 may determine an appointed place using location information of other users' portable terminals and may suggest a movement route to move towards the appointed place. If a user requests a content, the controller 100 may calculate a surplus time and may control related functions to provide contents that can be available within the surplus time.

In the following description, the controller 100 will be explained as a controller of the first portable terminal 200.

In order to calculate an appointed place based on location information of a portable terminal, the controller 100 may request location information of other users' portable terminal, and a map from a base station through the RF communication unit 160. When the controller 100 receives location information and a map from the base station, the controller 100 may instruct the appointed place calculating unit 102 to determine an appointed place based on location information of a current portable terminal and location information of the other users' portable terminal. The display unit 110 may then display the appointed place list and the map. For example, the controller 100 may map the appointed place determined using location information of a portable terminal to a particular map such as a subway route map, and may also instruct the the display unit 110 to display a corresponding list and a map.

The controller 100 may instruct the appointed place calculating unit 102 to select an appointed place and may select an appointed place list taking into consideration a movement time from a user's current location to the appointed place, a movement distance, and/or a movement route. For example, the controller 100 can select an appointed place based on a number of bus stops or the number of subway stations where the selected appointed place is located at an equal distance from all users so that all the users may take approximately the same amount of time to reach the location. The controller may also select an appointed place that is located approximately equidistance from all users. To this end, the controller 100 may control the appointed place calculating unit 102 to analyze a map and location information of respective portable terminals. The controller 100 can select a previously selected appointed place instead of a new place. That is, if a user's current location matches one in a list of appointed places stored in a schedule, the controller 100 can select the matching place as an appointed place.

If an appointed place is selected, the controller 100 may detect an input signal, corresponding to an appointment time output from the input unit 120. That is, the controller 100 may transmit/receive a message through the RF communication unit 160 to determine whether another user agrees to the appointment time. If an appointment time is input, the controller 100 may control the estimated travel time calculating unit 106 to calculate an expected departure time based on the appointed place and traffic means. After that, the controller 100 may determine a schedule, which includes information regarding the appointed place, appointment time, and/or expected departure time, and may then store the schedule in the memory 130. The controller 100 may also control the display unit 110 to display the determined schedule.

In order to determine a schedule, the controller 100 may select an appointed place list based on location information of one or more respective portable terminals and may detect an input signal corresponding to an appointment time. In some cases, the controller 100 may first detect an input signal corresponding to an appointment time through the input unit 120 and may subsequently select an appointed place using location information of respective portable terminals.

When an appointed place is selected, the controller 100 may control the movement route calculating unit 104 to determine a movement route towards the appointed place. When an expected departure time is reached, the controller 100 may instruct the audio processing unit 140 to output an audio signal notifying a user that the expected departure time has been reached. The controller 100 can also notify a user that a departure time has been reached via the display unit 110 and/or by a vibration motor.

The controller 100 may control operations for events generated during the movement to the appointed place. For example, if the controller 100 of the first portable terminal receives a message that another user has already arrived at the appointed place while the user of the first portable terminal 100 is moving to the appointed place, the controller 100 may instruct the RF communication unit 160 to transmit a message including the current location of the user and an expected arrival time to the other user. If a traffic-related event, such as a traffic accident or a traffic jam, occurs while the user is moving to the appointed place, the controller 100 may determine whether the event may affect the current route that the user is moving along. If the controller 100 determines that the occurred event will affect the movement route, the controller 100 may determine whether a detour or any other route may be recommended. After that, the controller 100 may instruct the movement route calculating unit 104 to determine a recommended route/detour to the appointed place and to generate a list. The controller 100 may instruct the display unit 110 to display the generated list.

If a user of the first portable terminal arrives at the appointed place earlier than another user, the controller 100 may transmit a message notifying arrival of the user to the other user through the RF communication unit 160. The controller 100 can request and receive a message regarding the other user's current location and expected arrival time through the RF communication unit 160. If an appointment standby time, equivalent to a difference of a current time to a time the other user will arrive, is equal to or greater than a preset value, the controller 100 may control the display unit 110 to display a message recommending the use of contents. The controller 100 may control the contents processing unit 108 to determine whether the user accesses the contents database and may receive a keyword related to selection of the contents database through the input unit 120. The controller 100 can instruct the display unit 110 to display a list of contents corresponding to the input keyword. The controller 100 can also instruct the display unit 110 to display a list of contents consistent with an appointed place, or a list of contents according to a user's history.

The appointed place calculating unit 102 may extract a point based on location information of a user's portable terminal, location information of a plurality of portable terminals, and information regarding the traffic means, where the point may be a place where various users' expected travel times are approximately similar to each other from their locations to the appointed place. The controller 100 can also extract a preset point from a stored schedule. After that, the controller 100 may set the extracted point to an appointed place.

The movement route calculating unit 104 may set a movement route towards an appointed place. If the portable terminal receives an event message of a traffic situation during the movement to the appointed place, the movement route calculating unit 104 may analyze location information and the movement route of the portable terminal and may compare them with the traffic situation to determine whether the traffic situation may affect the movement route. If the movement route calculating unit 104 determines that the traffic situation will affect the movement route, the movement route calculating unit 104 searches for a recommended route/detour to change the movement route.

The estimated travel time calculating unit 106 may calculate an expected estimated travel time required if the user moves to the appointed place along the movement route by traffic means, and an expected departure time based on the appointment time. If the portable terminal receives an event message that another user has already arrived at the appointed place while the user is moving to the appointed place, the estimated travel time calculating unit 106 may compare the current location information with the location information of the appointed place and may calculate an expected estimated travel time to arrive at the appointed place. If the estimated travel time calculating unit 106 detects a user's content request, the estimated travel time calculating unit 106 may calculate a surplus time that the user may take to move from the current location to the appointed place using the current location information and the location information of the appointed place. If the user has arrived at the appointed place according to the registered schedule, the estimated travel time calculating unit 106 may calculate a surplus time from a time that the user arrived at the appointed place to a time that the other user, who has not arrived, will arrive at the appointed place.

If the contents processing unit 108 detects a user's content request, the contents processing unit 108 may calculate a surplus time and may provide contents that can be available within the surplus time. For example, if the controller 100 detects a content request while the portable terminal user is moving to the appointed place, the controller 100 may instruct the contents processing unit 108 to calculate a surplus time required to move to the appointed place, using information regarding the user's current location and location information regarding the appointed place. The contents processing unit 108 may then provide contents available within the surplus time. If the portable terminal user arrives at the appointed place according to the registered schedule, the controller 100 can also output a list of contents available within a surplus time. In such cases, the surplus time may be calculated by the contents processing unit 108 and may be the time that the other user who has not arrived at the appointed place, will take to reach the appointed place from the current time. That is, the controller 100 may compare the playback time of contents with the surplus time and then output a list of contents that can be played back within the surplus time. Examples of the contents may include local information related to the appointed place, a list of contents related to local festivals and weather, a list of contents searched by a keyword that is input to the input unit of the portable terminal, and/or one of the files in a contents history stored in the memory.

As described above, the apparatus for providing a location-based scheduling service, according to the present invention, can perform corresponding processes when a portable terminal user registering a schedule is moving to an appointed place, and uses contents at the appointed place. These processes are explained in detail, below, with reference to the drawings.

Figure 2:
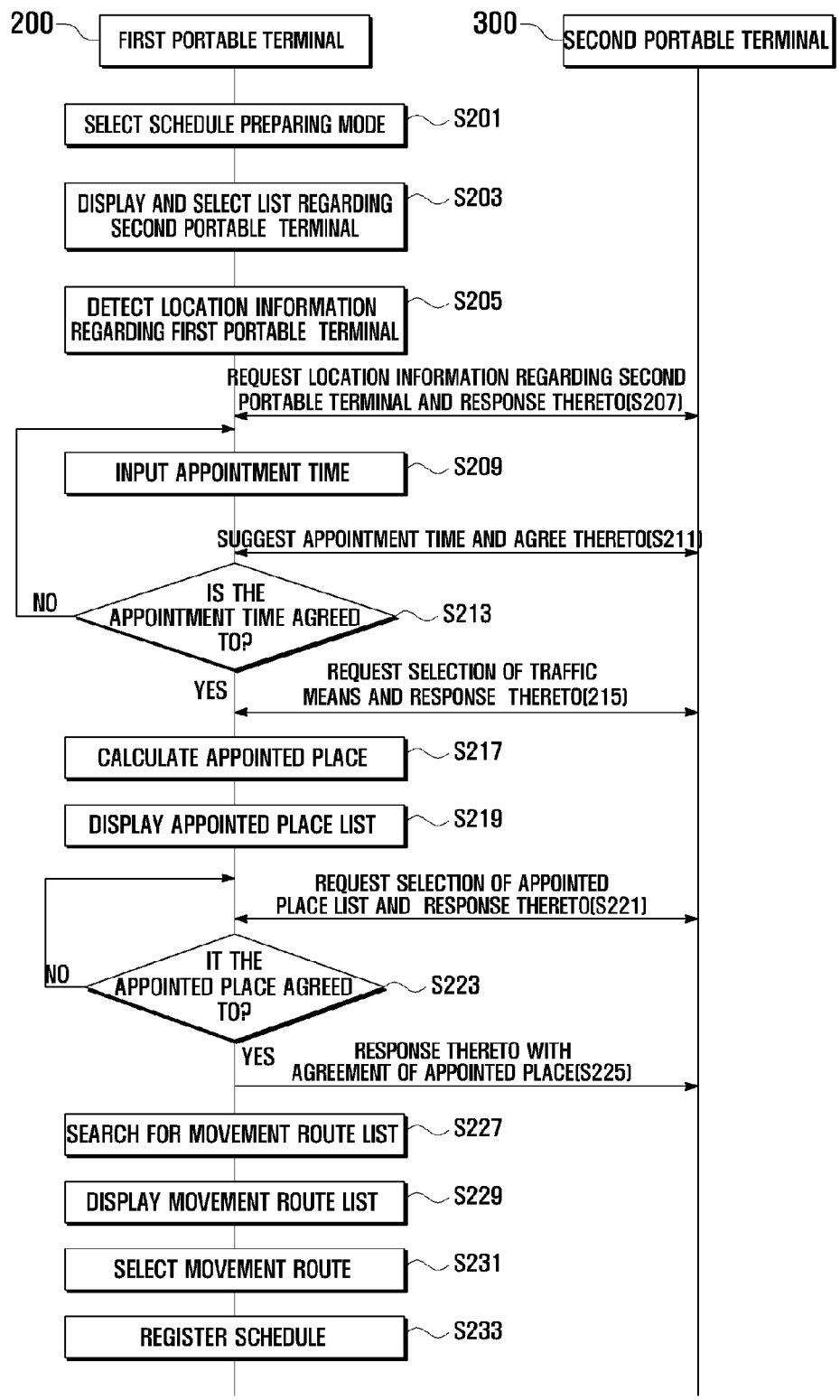
FIG. 2 is a signal flow chart describing a process for registering a schedule, according to an exemplary embodiment of the present invention.

FIG. 2 is a signal flow chart describing a process of registering a schedule, according to an exemplary embodiment of the present invention. FIG. 3A to FIG. 3H show screens displaying a process of registering a schedule according to an exemplary embodiment of the present invention.

Figure 3:
FIG. 3A, FIG. 3B, FIG. 3C, FIG. 3D, FIG. 3E, FIG. 3F, FIG. 3G, and FIG. 3H show screens displaying a process of registering a schedule, according to an exemplary embodiment of the present invention.

Referring to FIG. 2 and FIGS. 3A to 3H, if the controller 100 of the first portable terminal 200 detects, via the input unit 120, an input signal corresponding to a schedule preparation mode, the controller 100 may prepare a schedule (S201). The controller 100 may display a list of other users' portable terminals on the display unit 110 and may detect an input signal that is input to the input unit 120 to select a second portable terminal 300 as the other user's portable terminal (S203). The list of other users' portable terminals may be stored in the first portable terminal's 200 phone book. The controller 100 may select a plurality of portable terminals as the other user's portable terminal, e.g., the second portable terminal 300. That is, the controller 100 can select, via the input unit 120, one or more of the other users' portable terminals to be designated as the second portable terminal 300. As shown in FIG. 3A, the controller 100 may instruct the display unit 110 to display a list of the other users. The user of the first portable terminal 200 may be designated as 'A' and the other user of the second portable terminal 300 may be designated as 'B.'

The controller 100 may instruct the location tracking unit 150 to detect current location information (S205) and may then store the location information in the memory 130. The location information may include latitude and longitude of the first portable terminal 200. The controller 100 may analyze map information from the base station and may subsequently detect location information, such as an adjacent subway station location and/or an adjacent bus stop location. The map information may have been previously stored in the memory 130.

The controller 100 may instruct the RF communication unit 160 to request location information in order to receive current location information regarding the second portable terminal 300 (S207). The controller 100 may request location information regarding the second portable terminal 300 from the base station via the RF communication unit 160. The controller 100 may receive the current location information regarding the second portable terminal 300 from the base station via the RF communication unit 160 and may store the current location information regarding the second portable terminal 300 in the memory 130. If the second portable terminal 300 can collect its current location information, the controller 100 of the first portable terminal 200 may also directly receive the location information regarding the second portable terminal 300 from the second portable terminal 300.

The controller 100 may detect an input signal regarding an appointment time via the input unit 120 (S209). The controller 100 may store the appointment time and the input to the input unit 120 in the memory 130.

The controller 100 of the first portable terminal 200 may transmit a message for suggesting the input appointment time to the second portable terminal 300 (S211). As shown in FIG. 3B, the controller 100 can transmit the message to the second portable terminal 300 to suggest an appointment time to the user of the second portable terminal 300. The controller 100 may receive a reply message to the suggested appointment time from the second portable terminal 300.

The controller 100 may determine whether the reply message from the second portable terminal 300 agrees to the suggested appointment time (S213). If the controller 100 ascertains that the reply message agrees to the suggested appointment time at S213, the controller 100 may transmit a message to the second portable terminal 300 requesting a selection regarding traffic means to move to the appointed place (S215). As shown in FIG. 3C, the controller 100 may transmit a suggestion message for selecting traffic means to the second portable terminal 300 through the RF communication unit 160. In the illustrated message, 'A' denotes the user of the first portable terminal 200. The other user may select traffic means, such as self-drive, subway, and/or walk, to move to the appointed place. The controller 100 may receive a reply message regarding the traffic means that the user of the second portable terminal 300 intends to use. On the contrary, if the controller 100 ascertains that the reply message does not agree to the suggested appointment time at S213, the controller 100 may receive another appointment time via the input unit 120 and may then transmit the other appointment time to the second portable terminal 300.

The controller 100 may calculate an appointed place based on pieces of location information regarding the first and second portable terminals 200 and 300 (S217). The controller 100 may select an appointed place on the list taking into consideration pieces of location information regarding the first and second portable terminals 200 and 300, an appointment time, and traffic means. The controller 100 may instruct the appointed place calculating unit 102 to select a plurality of appointed places taking into consideration locations between the portable terminal users, an appointment time, and/or traffic means. The controller 100 can select a previously selected appointed place instead of a new place. That is, the controller 100 can select a place as an appointed place that is listed in a list of appointed places in a stored schedule. As shown in FIG. 3D, the controller 100 can instruct the display unit 110 to display a screen showing that a list of appointed places is being searched. In FIG. 3E, the controller 100 may instruct the display unit 110 to display a list of appointed places that is calculated based on pieces of location information regarding the first and second portable terminals 200 and 300 (S219).

In order to determine an appointed place, the controller 100 may transmit a message including the list of appointed places to the second portable terminal 300 so that the user of the second portable terminal 300 can select one of the appointed places. The first portable terminal 200 can receive a reply message of a selected appointed place from the second portable terminal 300 (S221). For example, as shown in FIG. 3F, the controller 100 may receive a message from the other user indicating the selected appointed place via the RF communication unit 160.

The controller 100 may determine whether to receive a message including the selected appointed place from the second portable terminal 300 (S223). If the controller 100 receives, from the second portable terminal 300, a message in which the other user does not agree with the appointed place at S223, the controller 100 may re-transmit, to the second portable terminal 300, a message requesting the other user to select another appointed place from the list. If the controller 100 receives a message from the second portable terminal 300 indicating that the other user agrees to the appointed place at S223, the controller 100 may transmit an acknowledgement message to the second portable terminal 300 (S225). As shown in FIG. 3G, the controller 100 may transmit a consent message regarding the suggested appointed place via the RF communication unit 160.

When the appointed place is determined, the controller 100 searches for a list of movement routes to move to the appointed place (S227).

As shown in FIG. 3H, the controller 100 may instruct the display unit 110 to display a list of searched movement routes (S229). The movement routes can be suggested based on the shortest route in terms of time, distance, and/or traffic means from the current location to the appointed place. For example, if traffic means is subway, a list of movement routes can be suggested in light of the minimum number of transfer stations or the number of subway stations.

The controller 100 may detect an input signal for selecting one of the movement routes in the list displayed on the display unit 110 (S231). The controller 100 may calculate an estimated travel time for the selected movement route. The controller 100 can also calculate an expected departure time based on the estimated travel time and the appointment time.

When a movement route is selected with respect to the appointed place, the controller 100 may detect an input signal for registering a schedule via the input unit 120 (S233). The schedule may include information regarding the appointed place and the appointment time, which can be calculated based on pieces of location information associated with the portable terminals. The controller 100 may store the input schedule in the memory 130.

In some exemplary embodiments of the present invention, the controller 100 may detect an input signal corresponding to the appointment time to register a schedule and may select appointed places using pieces of location information associated with the respective portable terminals. In such cases, the controller 100 may select a list of appointed places based on pieces of location information associated with respective portable terminals and may then detect an input signal corresponding to an appointment time via the input unit 120.

FIG. 4 is a flow chart describing a process where a user moves to an appointed place according to a registered schedule, according to an exemplary embodiment of the present invention. FIG. 5A to FIG. 5E show screens displaying a process where a user moves to an appointed place according to a registered schedule, according to an exemplary embodiment of the present invention.

Referring to FIG. 4 and FIGS. 5A to 5E, the controller 100 may be operated in a standby mode to move to an appointed place (S401).

During the standby mode for moving to an appointed place, the controller 100 may determine whether a time for the user to move to the appointed place has arrived (S403). The controller 100 may determine whether an expected departure time is reached using data related to an appointment time of a schedule stored in the memory 130. The expected departure time may be set based on the appointment time and the estimated travel time from the current location to the appointed place. If it takes 1 hour to move from the current location to the appointed place, the controller 100 may set the expected departure time to 1 hour 10 minutes before the appointment time.

If the expected departure time has been reached at S403, the controller 100 may notify the user of the the expected departure time using the audio processing unit 140, the display unit 110, and/or a vibration motor (S405). The controller 100 can also instruct the display unit 110 to display a selected movement route to move towards the appointed place. As shown in FIG. 5A, the controller 100 may instruct the display unit 110 to display the selected traffic means and a movement distance. If the expected departure time has not been reached at S403, the controller 100 may operate in a standby mode for movement to the appointed place until the expected departure time is reached.

The controller 100 may detect an input signal corresponding to a confirmation regarding the expected departure time to move to the appointed place (S407). During the movement to the appointed place, the controller 100 of the first portable terminal may instruct the location tracking unit 150 to periodically receive location information associated with the first portable terminal from the base station or the GPS satellite and may store the location information in the memory 130.

During movement of the portable terminal, the controller 100 may determine whether an event occurs via the RF communication unit 160 (S409). The event may include events and traffic situation events affecting the other user's terminal (i.e., second portable terminal 300). The controller 100 can detect whether to receive a message regarding an event via the RF communication unit 160. The event may be that the other user has already arrived at the appointed place or may be related to a traffic situation, such as a traffic accident or traffic jam that has occurred on the movement route.

If the controller 100 receives a message that the other portable terminal (i.e., second portable terminal 300) user has already arrived at the appointed place (i.e., a message regarding the other user's event), the controller 100 may instruct the display unit 110 to display the message, as shown in FIG. 5B (S411). After that, the controller 100 may transmit a message related to the current location of the first portable terminal user and/or an expected arrival time at the appointed place to the other user's portable terminal via the RF communication unit 160 (S413). As shown in FIG. 5C, the controller 100 may instruct the RF communication unit 160 to transmit a message including the current location and/or the estimated travel time of the first portable terminal to the other user's portable terminal.

If the controller 100 receives a message regarding a traffic-related event such as a traffic accident or traffic jam at S409, the controller 100 may determine whether the occurred event affects the movement route (S415). To determine whether an occurred event affects a movement route, a corresponding route and information regarding a location where the event has occurred may be compared. If the occurred event affects the movement route at S415, the controller 100 may search for a list of recommended routes/detours to avoid the place where the event has occurred (S417). The controller 100 can receive traffic situation information from a traffic control center via the RF communication unit 160. The controller 100 may instruct the appointed place calculating unit 102 to search for a list of recommended routes/detours taking into consideration location information associated with the first portable terminal user, the appointment time, and/or the estimated travel time to the appointed place. The controller 100 can search for a list of recommended routes/detours using a map and traffic situation information transmitted from the traffic control center.

The controller 100 may instruct the display unit 110 to display the list of searched recommended routes/detours (S419). As shown in FIG. 5D, if the first portable terminal user moves with his/her own car as a traffic means, the controller 100 may: calculate a distance and an estimated travel time from the current location to the appointed place; generate a list of recommended routes/detours; and instruct the display unit 110 to display the generated list and the map. The controller 100 may detect an input signal to select one of the recommended routes/detours on the list via the input unit 120 (S421). The controller 100 may designate the selected movement route as a new route to move to the appointed place and may subsequently store the newly designated route as a new movement route in the memory 130. If one of the recommended routes/detours in the list is selected, the controller 100 may return to and proceed with S409 and may determine whether an event occurs. The controller 100 may receive messages via the RF communication unit 160 and may determine whether a message regarding an occurred event has been received.

If the controller 100 does not receives a message related to an event while the first portable terminal user is moving to the appointed place using the recommended routes/detours, the first portable terminal user may keep moving to the appointed place.

The controller 100 may determine whether the first portable terminal user arrives at the appointed place using current location information that is received from the base station via the location tracking unit 150 (S423).

If the controller 100 ascertains that the first portable terminal user arrives at the appointed place at S423, the controller 100 may terminate a service guiding the movement route and may transmit a message to the other user's portable terminal indicating that the first portable terminal user has arrived at the appointed place (S425). The message, as shown in FIG. 5E, is sent to the other user.

If the first portable terminal user intends to meet a plurality of other users at an appointed place, the controller 100 of the first portable terminal can acquire pieces of information regarding locations of the other users' portable terminals and can display the locations on the map. For example, if a user who has not arrived at the appointed place is moving by subway, the controller 100 may highlight a subway station where the user is located on the subway route map.

If the controller 100 ascertains that the first portable terminal user has not arrived at the appointed place at S423, the controller 100 may return to and proceed with S409 and may determine whether an event has occurred.

Figure 6:
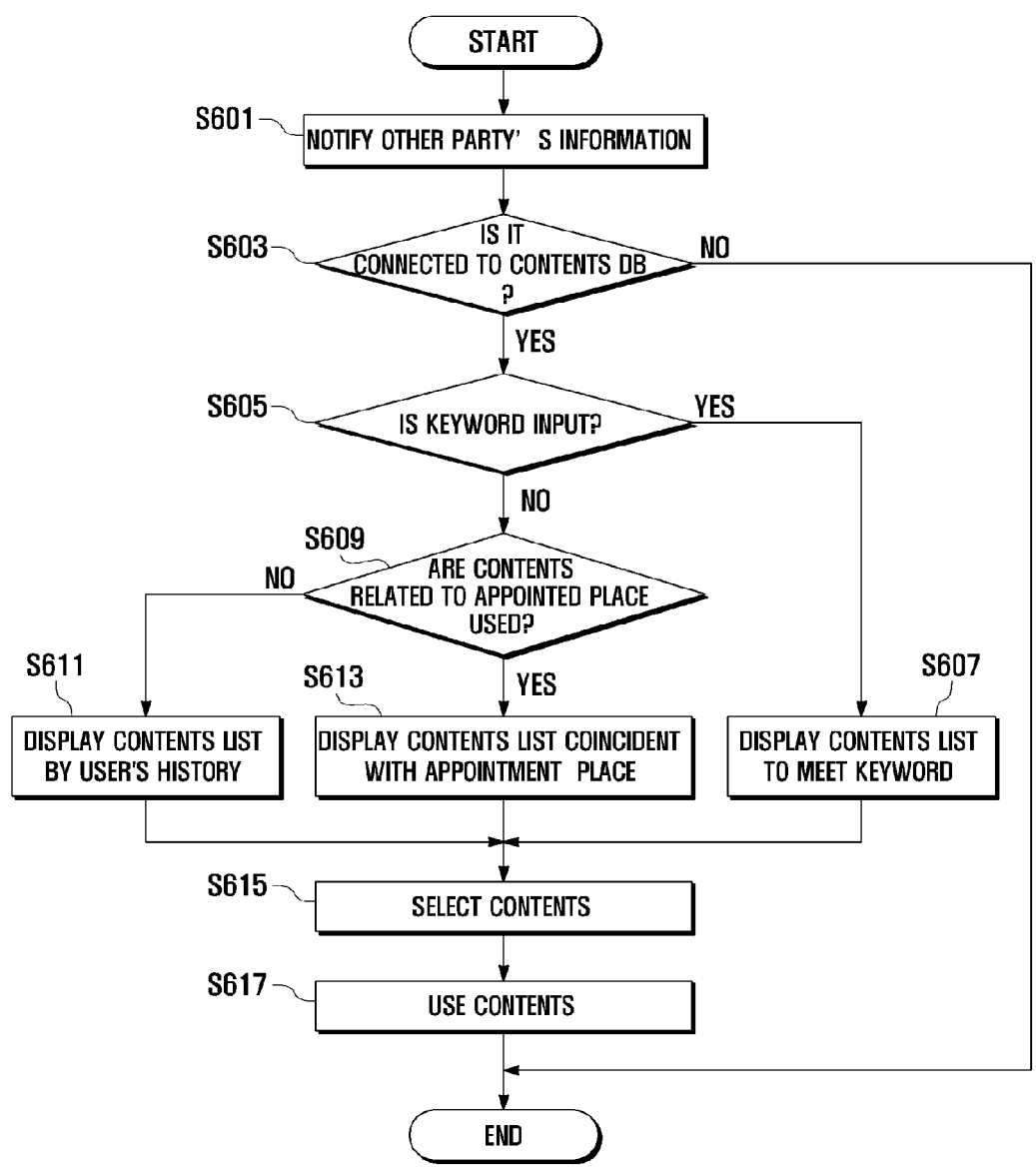
FIG. 6 is a flow chart describing a process for providing contents, according to an exemplary embodiment of the present invention.

FIG. 6 is a flow chart describing a process for providing contents according to an exemplary embodiment of the present invention. FIG. 7A to FIG. 7F show screens displaying a process for providing contents according to an exemplary embodiment of the present invention.

Referring to FIG. 6 and FIGS. 7A to 7F, if a user of the first portable terminal has arrived at an appointed place, the controller 100 of the first portable terminal may request, via the RF communication unit 160, the other user's current location information and expected arrival time from the other user's portable terminal and may receive a message thereto (S601). For example, the controller 100 may request a message of surplus time from the other user's portable terminal, where the surplus time may be a period of time from a time point that the user has arrived at the appointed place to a time point that the other user will arrive at the appointed place.

As shown in FIG. 7A, the controller 100 may instruct the display unit 110 to display a message that includes the other user's current location and the surplus time. If the other user has not yet arrived at the appointed place, the controller 100 may determine whether the user may access a content database while waiting for the other user to arrive (S603). That is, the controller 100 may determine whether the contents available with the surplus time are being used. To this end, the controller 100 may generate a pop-up message. As shown in FIG. 7B, the controller 100 may control the display unit 110 to display a pop-up message inquiring whether to use a content.

If the controller 100 detects a signal regarding content database access via the input unit 120 at S603, the controller may instruct the display unit 110 to display a screen to set contents, as shown in FIG. 7C, and may determine whether to input a signal of a key word (S605). If the controller 100 detects a signal regarding content database access refusal via the input unit 120 or does not detect any input signal for a certain period of time at S603, the controller 100 may cease performing a corresponding service.

As shown in FIG. 7D, if a keyword is input via the input unit 120 at S605, the controller 100 may instruct the display unit 110 to display the keyword (S607). The term 'keyword' may refer to an input word for searching for contents. If a keyword is not input via the input unit 120 at S605, the controller 100 may determine whether the user uses contents related to the appointed place (S609).

If the controller 100 detects an input signal for the user of contents related to the appointed place at S609, the controller 100 may download a list of contents consistent with the appointed place from a contents server and may instruct the display unit 110 to display the downloaded list of contents as shown in FIG. 7E (S613). For example, the controller 100 may instruct the display unit 110 to display a list of weather information related to the appointed place, local information, and/or favorite restaurants, so that the user can select one of them. If the controller 100 does not detect an input signal from the user of contents related to the appointed place at S609, the controller 100 may instruct the display unit 110 to display a list of history of contents used by the user, as shown in FIG. 7F (S611). The controller 100 can instruct the display unit 110 to display a list of contents according to a keyword, a list of contents according to a history of the contents used by the user, or a list of contents consistent with an appointed place according to the order of priority of playback time. The displayed list is a list whose playback time meets the other user's expected arrival time.

The controller 100 may detect an input signal corresponding to one selected, via the input unit 120, from the list of contents according to a keyword, the list of contents according to a history of the contents used by the user and the list of contents consistent with an appointed place (S615). That is, the controller 100 may detect an input signal that selects one of the contents in a list or one of the contents in a history list. The contents in the list may be searched by a keyword and may be consistent with the appointed place. The contents in the history list may be used by the user.

If one of the contents in a list is selected, the controller 100 may instruct the display unit 110 to display the content until another input signal is input via the input unit 120 (S617).

Figure 8:
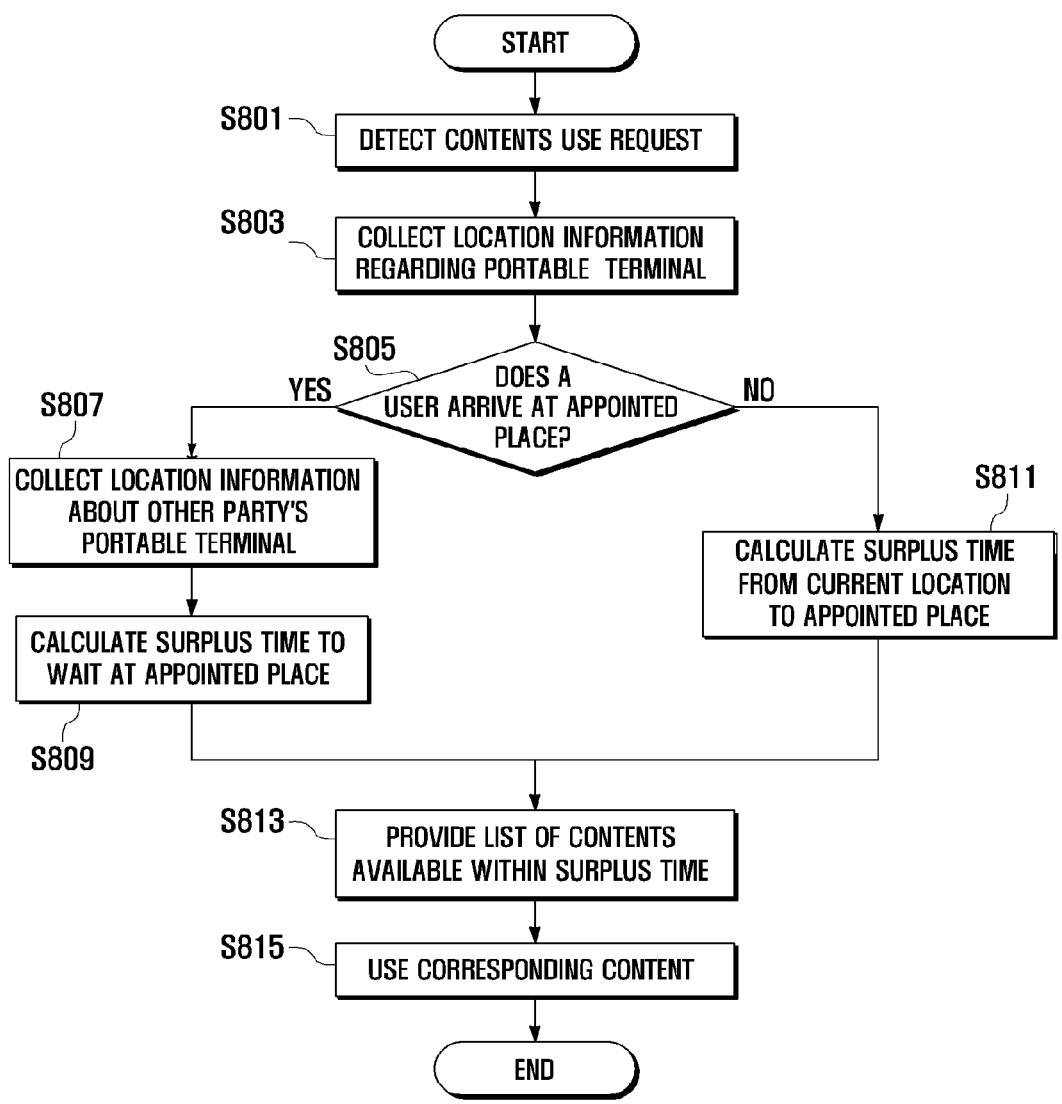
FIG. 8 is a flow chart describing a process that collects location information regarding a portable terminal, calculates a surplus time, and provides contents, according to an exemplary embodiment of the present invention.

FIG. 8 is a flow chart describing a process that collects location information regarding a portable terminal, calculates a surplus time, and provides contents according to an exemplary embodiment of the present invention.

Referring to FIG. 8, the controller 100 may detect an input signal corresponding to a user's contents use request while the user is moving to the appointed place (S801).

If the controller 100 of a portable terminal detects an input signal corresponding to a contents use request of the portable terminal user at S801, the controller 100 may control the location tracking unit 150 to collect current location information of the portable terminal (S803).

When the controller 100 collects the current location information, the controller 100 may determine whether the portable terminal user arrives at the appointed place (S805). The controller 100 may also calculate the surplus time to use contents. A determination regarding arrival of the portable terminal user may be made by comparing the current location information of the portable terminal with location information of the appointed place.

If the controller 100 ascertains that the portable terminal user may have arrived at the appointed place at S805, the controller may transmit a message requesting the other user's location information to the base station to collect location information regarding the other user's portable terminal (S807). The location information of the other user's portable terminal may be used to calculate a surplus time that the portable terminal user may wait at the appointed place until the other user arrives thereat.

The controller 100 may compare the current location information of the portable terminal with location information of the appointed place to determine whether the portable terminal user has arrived at the appointed place. In some exemplary embodiments, at least one other user's portable terminal may be used.

When the controller 100 collects location information of the other user's portable terminal at S807, the controller 100 may calculate the surplus time that the portable terminal may wait from a time that the portable terminal user has arrived at the appointed place to a time that the other user will have arrived at the appointed place (S809). The controller 100 may instruct the estimated travel time calculating unit 106 to calculate the surplus time. The estimated travel time calculating unit 106 may compare the current location information of the other's portable terminal with location information of the appointed place based on traffic means. The portable terminal user can use contents available within the surplus time until the other user arrives at the appointed place.

If the controller 100 ascertains that the portable terminal user has not arrived at the appointed place at S805, the controller 100 may calculate the surplus time that the portable terminal user takes to arrive at the appointed place from the current location (S811). The controller 100 may instruct the estimated travel time calculating unit 106 to calculate the surplus time. The controller 100 may compare the current location information of the portable terminal with location information of the appointed place and may determine whether the portable terminal user has arrived at the appointed place. The estimated travel time calculating unit 106 may compare the current location information of the portable terminal user with location information of the appointed place in light of traffic means, and may calculate the surplus time that the portable terminal user may take to arrive at the appointed place from the current location. The surplus time may refer to a period of time within which the portable terminal user can be provided with available contents from the current location until the user arrives at the appointed place.

When the surplus time has been calculated through location information regarding the portable terminal, the location information regarding the other user's portable terminal, and the location information regarding the appointed place, the controller 100 may be provided with a list of available contents within the surplus time.

The controller 100 may provide a list of contents available within the surplus time (S813). The controller 100 may instruct the display unit 110 to display a list of contents when a keyword is input in the process of setting contents. The controller 100 may provide a list of contents related to the appointed place. The controller 100 may download, from the contents server, a list of contents consistent with the appointed place to use contents related to the appointed place. The controller 100 may instruct the display unit 110 to display the list of contents consistent with the appointed place. Examples of the list include weather information related to an appointed place, local information, and/or favorite restaurants. The controller 100 can also instruct the display unit 110 to display a list of history of contents used by the user.

The controller 100 may instruct the display unit 110 to only display lists that can be played back within the surplus time. Suitable lists may include a list of contents according to a keyword, a list of history of the contents used by the user, or a list of contents consistent with an appointed place, The controller 100 may detect an input signal corresponding to a list selected from the list of contents according to a keyword, the list of history of the contents used by the user, and/or the list of contents consistent with an appointed place (S815). If one of the contents is selected, the controller 100 may instruct the display unit 110 to display the selected content until another signal is input via the input unit 120.

As described above, the method and apparatus for providing location information-based scheduling service can appropriately determine an appointed place taking into consideration a distance between the portable terminal user and other portable terminal users and their movement times. The LBS may also allow users to share their expected arrival times and information regarding their current locations while they are moving to the appointed place.

The method and apparatus for providing location information-based scheduling service can also calculate surplus time if a portable terminal user requests a content, and recommend and provide available contents within the surplus time so that users can efficiently use their time.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for providing a location information-based scheduling service, the method comprising:
receiving, by a first portable terminal, pieces of location information from at least one other portable terminal;
comparing the pieces of location information with location information associated with an appointed place;
calculating a surplus time of the first portable terminal; and
providing, by the first portable terminal, contents determined to be displayable,
wherein the contents are determined to be displayable based on the surplus time.

2. The method of claim 1, wherein the surplus time is an estimated travel time of a user of the first portable terminal to travel from a current location to the appointed place, the current location being a different location than the appointed place.

3. The method of claim 1, wherein the surplus time is a period of time corresponding to a difference between an arrival time of a user of the first portable terminal at the appointed place to an expected arrival time of a user of the at least one other portable terminal at the appointed place.

4. The method of claim 1, wherein providing contents determined to be displayable comprises:
outputting one of contents in a first list, the contents in the first list being related to information and weather related to the appointed place;
outputting one of contents in a second list, the contents in the second list being searched using a keyword that is input to an input unit of the first portable terminal that has arrived at the appointed place; and
outputting one of a history of contents stored in the first portable terminal that has arrived at the appointed place.

5. The method of claim 1, further comprising:
determining, by the first portable terminal, an appointment time with the at least one other portable terminal;
selecting, by the first portable terminal, the appointed place based on the pieces of location information;
collecting, by the first portable terminal, traffic options of the at least one other portable terminal to move to the appointed place, the traffic options comprising traffic routes and modes of transportation;
determining a movement route to move to the appointed place based on the location information and the traffic options; and
registering a schedule comprising the location information, the appointment time, the traffic options, the appointed place, and the movement route.

6. The method of claim 5, wherein selecting the appointed place comprises:
selecting, by the first portable terminal, a place as the appointed place, based on the pieces of location information, and traffic options, the selection being made so that a user of the at least one other portable terminal takes an equal amount of time to reach the appointed place as the user of the first portable terminal takes to reach the appointed place; or
selecting, by the first portable terminal, a place stored in the schedule as the appointed place.

7. The method of claim 5, further comprising:
calculating an expected departure time based on the appointment time and an estimated travel time, the first portable terminal moving along the movement route provided by the traffic options;
adding the expected departure time to the schedule;
checking whether a current time of the first portable terminal is the expected departure time;
outputting an alarm if the current time is the expected departure time; and
displaying the movement route to the appointed place and the traffic options on a display unit of the at least one other portable terminal.

8. The method of claim 1, further comprising:
receiving a message of an event while the first portable terminal is moving towards the appointed place;
comparing, if the event in the message is an event related to a traffic situation, by the first portable terminal, current location information of the first portable terminal with the traffic situation;
determining whether the traffic situation affects an estimated travel time of the first portable terminal while the first portable terminal moves towards the appointed place along the movement route; and
searching, if the traffic situation affects the estimated travel time, for a recommended route to change the movement route.

9. The method of claim 1, further comprising:
receiving a message of an event while the at least one other portable terminal is moving towards the appointed place;
comparing, if the event in the message is an event notifying that the first portable terminal has arrived at the appointed place, current location information of the at least one other portable terminal with location information regarding the appointed place;
calculating an estimated travel time from the current location of the at least one other portable terminal to the appointed place; and
transmitting a message comprising the current location information of the at least one other portable terminal and the estimated travel time to the first portable terminal.

10. An apparatus to provide a location information-based scheduling service, the apparatus comprising:
a location tracking unit to receive pieces of location information from at least one portable terminal; and
a controller to compare the pieces of location information with location information associated with an appointed place, the controller configured to calculate surplus time and provide available contents determined to be displayable,
wherein the contents are determined to be displayable based on of the surplus time.

11. The apparatus of claim 10, wherein the surplus time is an estimated travel time of a user of the apparatus to travel from a current location to the appointed place, the current location being different than the appointed place.

12. The apparatus of claim 10, wherein the surplus time is a period of time corresponding to a difference between an arrival time of a user of the apparatus at the appointed place to an arrival time of a user of the at least one portable terminal at the appointed place.

13. The apparatus of claim 10, wherein the controller comprises a contents processing unit configured to output:
one of contents in a first list, the contents in the first list being related to information and weather related to the appointed place;
one of contents in a second list, the contents in the second list being searched by using a keyword that is input to an input unit of the apparatus, the apparatus having arrived at the appointed place; or
one of contents in a third list, the contents in the third list being previous files extracted from a history of contents stored in the apparatus, the apparatus having arrived at the appointed place.

14. The apparatus of claim 10, wherein the controller is configured to collect information regarding an appointment time of the apparatus and information regarding traffic options to move towards the appointed place for the apparatus and the at least one portable terminal, the controller being configured to select the appointed place based on the appointment time, the location information and the traffic options, and to determine a movement route to move towards the appointed place, the traffic options comprising traffic routes and modes of transportation.

15. The apparatus of claim 14, wherein the controller further comprises:
a memory to store a schedule comprising the location information, the appointment time, the traffic options, the appointed place, and the movement route; and a display unit to display the movement route and the traffic options to move towards the appointed place.

16. The apparatus of claim 10, wherein the controller comprises an appointed place calculating unit to select the appointed place, the appointed place being determined based on pieces of location information associated with the apparatus and the at least one portable terminal, and the traffic options, so that the at least one portable terminal travels for an equal amount of time to reach the appointed place as the apparatus travels to reach the appointed place, or the appointed place is extracted and selected from a schedule stored in the apparatus.

17. The apparatus of claim 14, wherein the controller comprises an estimated travel time calculating unit to calculate an expected departure time based on the appointment time and an estimated travel time, the apparatus moving along the movement route provided by traffic options.

18. The apparatus of claim 10, wherein the controller comprises a movement route calculating unit to determine a movement route to move towards the appointed place, to receive a message of an event related to a traffic situation during movement towards the appointed place, to compare current location information of the apparatus with the traffic situation, to determine whether the traffic situation affects the movement route, and to search for a recommended route to change the movement route if the traffic situation affects the movement route.

19. The apparatus of claim 10, wherein, if the controller receives an event message indicating that the at least one portable terminal has arrived at the appointed place, the controller is configured to instruct an estimated travel time calculating unit to compare current location information of the apparatus with location information associated with the appointed place to calculate an estimated travel time from the current location of the apparatus to the appointed place, the controller configured to transmit a second message comprising the current location information of the apparatus and the estimated travel time to the at least one portable terminal.

* * * * *